(12) United States Patent
Hurst et al.

(10) Patent No.: US 9,750,186 B2
(45) Date of Patent: Sep. 5, 2017

(54) WALK-BEHIND MOWER INCLUDING DEBRIS CONTAINER

(71) Applicant: The Toro Company, Bloomington, MN (US)

(72) Inventors: John O. Hurst, Lakeville, MN (US); Chris A. Wadzinski, Inver Grove Heights, MN (US); John T. Gill, Savage, MN (US); Daniel C. Johnson, Minneapolis, MN (US); Lee G. Macklem, New Hope, MN (US); Mark W. Schulz, Minneapolis, MN (US); Charles A. Wood, Delano, MN (US)

(73) Assignee: THE TORO COMPANY, Bloomington, MN (US)

( * ) Notice: Subject to any disclaimer, the term of this patent is extended or adjusted under 35 U.S.C. 154(b) by 0 days.

(21) Appl. No.: 14/595,561

(22) Filed: Jan. 13, 2015

(65) Prior Publication Data
US 2016/0198631 A1  Jul. 14, 2016

(51) Int. Cl.
*A01D 43/00* (2006.01)
*A01D 43/06* (2006.01)
*A01D 43/063* (2006.01)

(52) U.S. Cl.
CPC .................. *A01D 43/0636* (2013.01)

(58) Field of Classification Search
CPC ........ A01D 43/063; Y10S 56/09; A01G 1/125
USPC ..... 56/202, 16.6, DIG. 9, 199, 2; 280/47.26; 383/16
See application file for complete search history.

(56) References Cited

U.S. PATENT DOCUMENTS

| | | | | |
|---|---|---|---|---|
| 2,598,382 A | * | 5/1952 | Holden | A01D 43/063 280/47.26 |
| 2,801,862 A | * | 8/1957 | Parker | A01G 1/125 15/79.1 |
| 3,065,588 A | * | 11/1962 | Shaw | A01D 43/077 415/71 |
| 3,110,998 A | * | 11/1963 | Goldberg | A01D 43/063 56/202 |
| 3,928,956 A | * | 12/1975 | Boyer | A01D 43/063 56/202 |

(Continued)

FOREIGN PATENT DOCUMENTS

| | | |
|---|---|---|
| EP | 1 759 576 B1 | 6/2011 |
| GB | 1913-10793 | 0/1914 |
| WO | WO 2007/069914 A1 | 6/2007 |

OTHER PUBLICATIONS

"Bagz-it Folding Carts" by People Powered Machines; Accessed on the Internet on Apr. 17, 2015 at <https://web.archive.org/web/20131031041632/http://www.peoplepoweredmachines.com/bagz/index.html>; archive dated Oct. 31, 2013, 2 pages.

(Continued)

*Primary Examiner* — Árpád Fábián-Kovács
(74) *Attorney, Agent, or Firm* — Mueting, Raasch & Gebhardt, P.A.

(57) ABSTRACT

A walk-behind is configurable in a grass catching mode, wherein a debris container is attached to the mower in a grass collecting configuration to permit the collection of grass clippings. The mower may further be configured such that the debris container is stored on the mower in a stowed configuration. The debris container may be partially or fully supported by a handle of the mower when in the stowed configuration.

20 Claims, 9 Drawing Sheets

(56) References Cited

U.S. PATENT DOCUMENTS

| | | | | | |
|---|---|---|---|---|---|
| 3,962,852 | A | * | 6/1976 | Boyer | A01D 43/063 56/202 |
| 4,214,424 | A | * | 7/1980 | Gobin | A01D 43/0631 56/16.6 |
| 4,693,064 | A | * | 9/1987 | Katayama | A01D 43/063 56/202 |
| 4,747,259 | A | * | 5/1988 | Kline | A01D 43/063 56/202 |
| 4,843,805 | A | * | 7/1989 | Satoh | A01D 43/063 56/16.6 |
| 4,846,588 | A | * | 7/1989 | Allen | A01D 43/063 220/908 |
| 4,848,070 | A | * | 7/1989 | Berglund | A01D 43/063 56/16.6 |
| 4,852,338 | A | * | 8/1989 | Hopkins | A01D 43/063 56/202 |
| 5,033,258 | A | * | 7/1991 | Morse | A01D 43/063 383/16 |
| 5,231,827 | A | * | 8/1993 | Connolly | A01G 1/125 241/101.1 |
| 5,243,809 | A | * | 9/1993 | Redding | A01D 43/063 55/364 |
| 5,794,425 | A | * | 8/1998 | Thomason | A01D 43/063 56/16.6 |
| 5,845,473 | A | * | 12/1998 | Hopkins | A01D 43/063 56/16.6 |
| 6,082,083 | A | | 7/2000 | Stalpes et al. | |
| 7,013,627 | B2 | | 3/2006 | Hebbard et al. | |
| 7,805,920 | B2 | * | 10/2010 | Hurst | A01D 34/71 56/320.2 |
| 2003/0182919 | A1 | | 10/2003 | Baumann et al. | |
| 2003/0221403 | A1 | * | 12/2003 | Hancock | A01D 43/063 56/202 |
| 2005/0055994 | A1 | * | 3/2005 | Hebbard | A01D 43/063 56/202 |
| 2010/0139230 | A1 | * | 6/2010 | Lambert | A01D 43/063 56/202 |

OTHER PUBLICATIONS

"Spring Bucket (29210)" by The Toro Company; Accessed on the Internet on Apr. 17, 2015 at <https://web.archive.org/web/20121017053240/http://www.toro.com/en-us/Homeowner/Yard-Tools/Debris-Management/Pages/Model.aspx?pid=Spring-Bucket-29210>; archive dated Oct. 17, 2012, 2 pages.

* cited by examiner

WALK-BEHIND MOWER INCLUDING DEBRIS CONTAINER

Embodiments described herein are directed generally to grounds maintenance apparatus such as lawn mowers, and more particularly, to a debris container/grass catcher for use with a lawn mower.

BACKGROUND

Lawn mowers of various configurations are known. For example, a fairly common design is that of a push or self-propelled, walk-behind mower with a cutting deck supported above a ground surface by a plurality of wheels.

Such mowers are generally configurable in one of: a grass catching or bagging mode; a side discharge mode; and a mulching mode. In the bagging mode, a grass catching bin is attached to the mower such that an opening of the bin is positioned in communication with a discharge outlet of the cutting deck. As a result, grass clippings produced by the mower may be collected in the debris container for subsequent disposal by the operator.

When configured in the side discharge or mulching mode, the grass catching bin is removed from the mower and remotely stored until needed again. In the mulching mode, grass is cut repeatedly by the mower and is eventually deposited back on the lawn surface. In the side discharge mode, grass clippings are discharged through a side discharge port of the mower back to the lawn surface.

SUMMARY

Embodiments described herein may provide a lawn mower including a deck having an upper wall and downwardly extending sidewalls that together define a cutting chamber. One or both of the upper wall and the sidewalls define a discharge port. The mower further includes: a plurality of wheels supporting the deck upon a ground surface; and a cutting element operatively supported within the cutting chamber. An operator handle assembly connected to the deck extends outwardly therefrom. The mower also includes a debris container defining an opening, the debris container adapted to attach to the mower in either: a grass collecting configuration, wherein the debris container is supported by one or both of the deck and the handle assembly such that the opening is in communication with the discharge port; and a stowed configuration, wherein the debris container is supported by the handle assembly such that the opening is exposed and accessible.

In another embodiment, a lawn mower is provided that includes a deck comprising an upper wall and downwardly extending sidewalls that together define a cutting chamber, wherein a discharge port extends through one or more of the upper wall and the sidewalls. The mower further includes: a plurality of wheels supporting the deck upon a ground surface; a prime mover attached to the upper wall of the deck; and a rotatable cutting element positioned within the cutting chamber, the cutting element operatively attached to an output shaft of the prime mover. An operator handle assembly connected to the deck extends upwardly and rearwardly. The mower also includes a debris container having mounting points and further defining an opening. The debris container is adapted to attach to the mower in either: a grass collecting configuration, wherein the mounting points mechanically couple to the deck such that the opening is in communication with the discharge port; and a stowed configuration, wherein the mounting points mechanically couple to the handle assembly such that the opening is exposed and accessible.

In yet another embodiment, a walk-behind lawn mower is provided that includes a deck having an upper wall and downwardly extending sidewalls that together define a cutting chamber, wherein a discharge port extends through one or more of the upper wall and the sidewalls. The deck further includes first and second receivers. The mower also includes: a plurality of wheels supporting the deck upon a ground surface; a prime mover attached to the upper wall of the deck; and a rotatable cutting element positioned within the cutting chamber, the cutting element operatively attached to an output shaft of the prime mover. A handle assembly is connected to the deck, wherein the handle assembly includes first and second handle tubes extending upwardly to form an operator control handle. The first and second handle tubes include third and fourth receivers, respectively. Also included is a debris container defining an opening. The debris container includes first and second mounting points and is adapted to attach to the mower in either: a grass collecting configuration, wherein the first and second mounting points mechanically couple to the first and second receivers, respectively, such that the opening is in communication with the discharge port; and a stowed configuration, wherein the first and second mounting points mechanically couple to the third and fourth receivers, respectively, such that the opening faces upwardly.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein:

FIGS. 7A-7B are enlarged, partial perspective views of the mower of FIG. 3 illustrating attachment of the debris container to the mower when the debris container is in the stowed configuration, wherein.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be specifically described and/or illustrated herein, are also contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, perpendicular, etc.), in the specification and claims are understood as being modified by the term "about."

Figure 1:
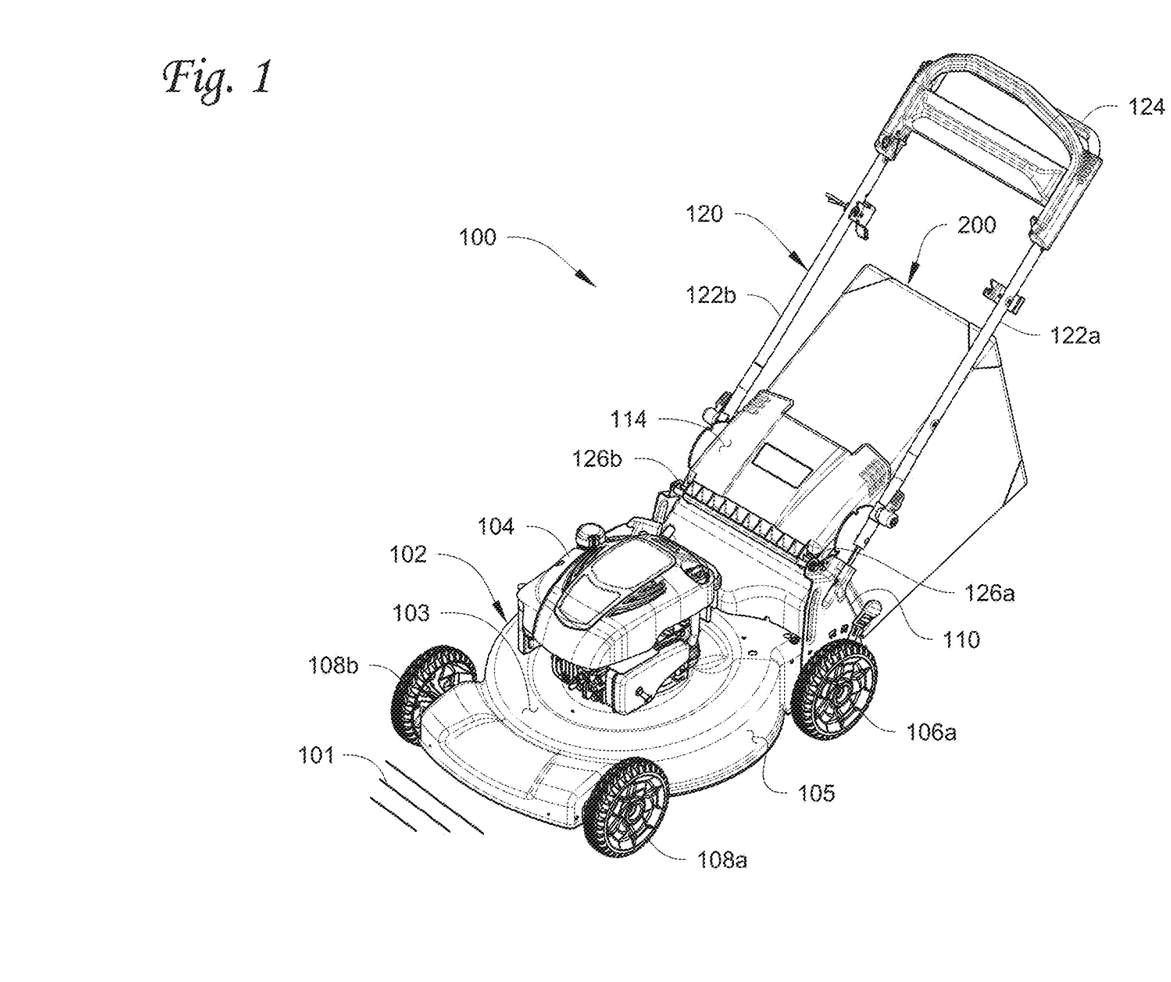
FIG. 1 is a perspective view of a walk-behind lawn mower having a debris container in accordance with one embodiment of the disclosure, the mower shown in a grass catching mode with the debris container shown in a grass collecting configuration.

FIG. 1 illustrates an exemplary embodiment of a walk-behind or walk-power mower 100 having a rearwardly extending operator handle assembly, the mower shown configured in a grass catching mode. In the grass catching mode, a debris container 200 may be attached to the mower (e.g., in a grass collecting configuration) in such a way as to permit the collection of grass clippings cut by the mower.

Figure 3:
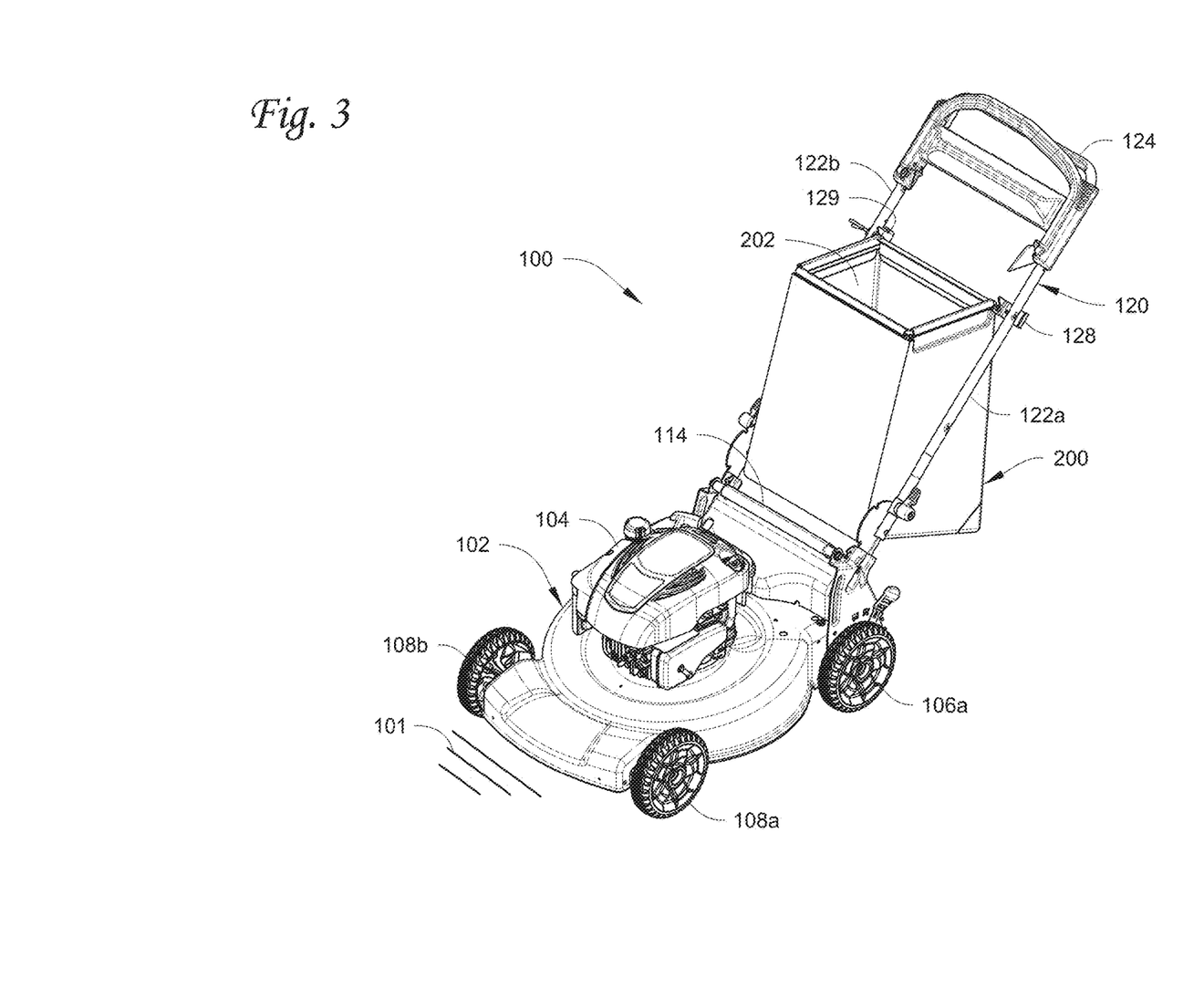
FIG. 3 is a perspective view of the mower of FIG. 2 with the mower shown in the mulching mode and the debris container shown attached to the mower (e.g., to a handle assembly of the mower) in a stowed configuration.

When the mower is operating in an alternative mode (e.g., a side discharge or mulching mode as further described below), the debris container 200 may be reconfigured from its grass collecting configuration, to a stowed configuration as shown in FIG. 3. When in the latter configuration, the debris container 200 is partially or completely supported by the handle assembly of the mower as further described below.

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective of one operating the mower 100 while the mower is in an operating configuration, e.g., while the mower 100 is positioned such that wheels 106 and 108 rest upon a generally horizontal ground surface 101 as shown in FIG. 1. These terms are used only to simplify the description, however, and not to limit the interpretation of any embodiment described.

Still further, the suffixes "a" and "b" may be used throughout this description to denote various left- and right-side parts/features, respectively. However, in most pertinent respects, the parts/features denoted with "a" and "b" suffixes are substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

While the general construction of the mower 100 is not necessarily central to an understanding of exemplary embodiments (e.g., other mower configurations are certainly possible), the general construction of the exemplary mower 100 is briefly described below. In some embodiments, the mower 100 may incorporate aspects of the mowers described in US-2003-0182919 to Baumann et al.

FIG. 1 illustrates the exemplary mower 100. As shown in this view, the mower 100 may include a housing or deck 102 supported in rolling engagement with the lawn or ground surface 101 by a plurality of wheels, e.g., rear wheels 106 and front wheels 108 (only rear wheel 106*a* is visible in FIG. 1, but opposite wheel 106*b* is substantially a mirror image). In the illustrated embodiment, the four wheels 106*a*, 106*b*, 108*a*, 108*b* may be positioned, respectively, at rear and front corners of the mower 100. Other wheel configurations (e.g., staggered wheel, tri-wheel, etc.) are also possible.

Figure 4:
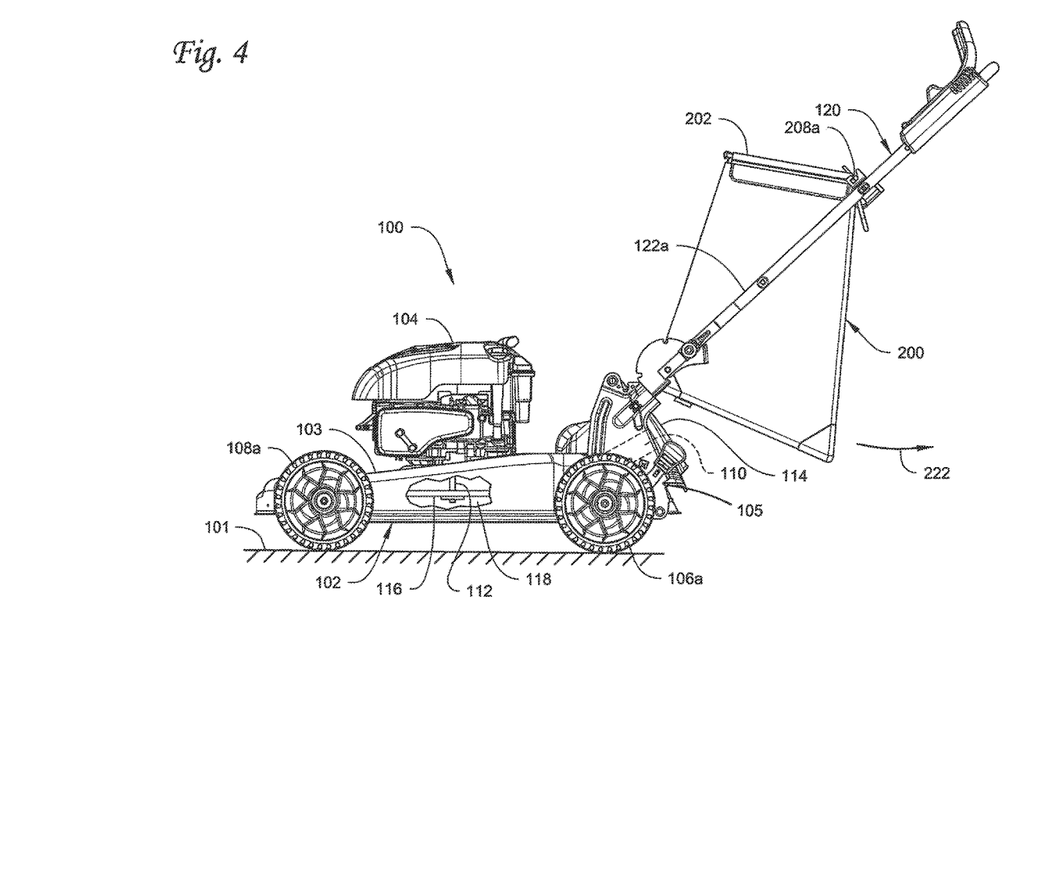
FIG. 4 is a side elevation view of the mower of FIG. 3.

The deck 102 may include an upper wall 103 and one or more downwardly extending sidewalls 105 that together define a downwardly opening cutting chamber 118 (see cut-away portion in FIG. 4). The upper wall 103 of the deck 102 may have attached or otherwise mounted thereon a prime mover, e.g., an internal combustion engine 104. While illustrated herein as an internal combustion engine 104, alternative power systems, such as an AC- or DC-powered electric motor, are also contemplated.

The engine 104 may be oriented such that its output shaft 112 (see cut-away portion of FIG. 4) extends vertically downward and passes through the upper wall 103 of the deck 102 and into the cutting chamber 118. A cutting element or blade 116 (see FIG. 4) may attach to a lower end of the output shaft 112 such that the blade is positioned and supported within the cutting chamber 118. During operation, the output shaft 112 rotates the cutting blade 116 at a speed sufficient to sever grass and other vegetation over which the mower 100 passes.

As stated above, the mower 100 may be self-propelled in that one or more of its wheels 106, 108 may receive driving power from the engine 104 via a transmission system (not shown). For example, the transmission may drive the wheels 106 and/or 108 in any combination (e.g., one or both of the front wheels, one or both of the rear wheels, one front and one rear wheel, or all four of the wheels may be driven). Alternatively, the wheels may be passive (e.g., non-driven), in which case the mower may be propelled by operator power.

The mower 100 may be configured for various operating modes as described below. For example, the deck 102 (e.g., one or both of the upper wall 103 or sidewalls 105) may include a rear discharge outlet or port 110 (i.e., passing from the cutting chamber 118 outwardly through the deck 102 as diagrammatically indicated in FIG. 4) for ejecting grass clippings cut by the cutting blade of the mower into the debris container 200. Such grass collection may occur when the mower 100 is in the grass catching mode of FIG. 1, corresponding to the debris container being in a grass collecting configuration.

Although not illustrated, the mower 100 may further include a selectively openable side discharge outlet for ejecting grass clippings to the side of the mower when the mower is in a side discharge mode (similar to port 124 and door 132 disclosed in US-2003-0182919). A rear door 114 (shown open in FIG. 1 and closed in FIGS. 2 and 4) may be provided to cover the rear discharge port 110 when the mower is not operating in the grass catching mode.

The mower 100 may further include an operator handle assembly 120 formed by one or more handle members (e.g., first and second handle tubes or members 122a, 122b) connected to the deck 102 and extending outwardly (e.g., upwardly and rearwardly) as shown in FIG. 1. In the illustrated embodiment, the handle members 122 are laterally spaced-apart and parallel as shown. Spacing between the two handle members 122 may be greater than a transverse width of the debris container 200 to allow vertical movement of the debris container during attachment/detachment.

The handle assembly 120 may further include one or more operator control or grip handles 124 located at or near a distal (upper) end. The grip handle 124 may connect the upper ends of the two handle members 122 to produce, as shown in FIG. 1, the generally U-shaped handle assembly 120.

The handle assembly 120 (e.g., the handle members 122 and/or the grip handle 124) may also include various controls (e.g., drive transmission, operator presence control, etc.) for operating the mower. As a result, an operator walking behind the mower 100 may grasp the grip handle 124 and control mower operation via manipulation of the grip handle and/or the various controls located thereon. In some embodiments, the handle assembly 120 may be configured as generally described in U.S. Pat. No. 6,082,083 to Stalpes et al.

As stated above, the mower 100 may be configured to operate in either of at least two modes. In the grass catching mode of FIG. 1, the rear door 114 is opened to permit attachment of the debris container 200 to the mower in the grass collecting configuration. In the grass collecting configuration, the debris container 200 may be supported by one or both of the deck 102 and the handle assembly 120 such that an opening 202 (see FIGS. 2 and 3) of the debris container 200 is positioned in communication with the rear discharge port 110 (see, e.g., FIGS. 1 and 4). As a result, grass clippings that are cut by the mower may exit through the rear discharge port 110 and be deposited within the debris container 200. Of course, in the grass catching mode, the side discharge port (not shown) would typically be closed to prevent side discharge of grass clippings.

Conversely, when the mower 100 is configured in the mulching mode (see FIG. 2), the debris container 200 is removed from the rear of the mower and the rear door 114 is closed to cover the rear discharge port 110. In one embodiment, a mulch plug (not shown) may be placed within the rear discharge port before closing the rear door. The mulch plug may provide an inner surface having a shape that corresponds to that of the cutting chamber, potentially providing for more effective mulching of the cut grass. The side discharge outlet (not shown) may also be closed when the mower 100 is in the mulching mode. As a result, the grass clippings are circulated within the cutting chamber of the deck 102 where they are repeatedly cut (mulched) by the cutting blade. The finely cut clippings may then fall back to the lawn (ground surface 101).

Although the side discharge mode is not illustrated, the debris container 200 would again be removed and the door 114 closed. However, in this mode, the side discharge door would be opened such that grass clippings would be discharged through the side discharge outlet instead of through the rear discharge port 110. To facilitate directional control of the ejected grass clippings, a side discharge deflector (not shown, but see deflector 126 of US2003-0182919) may be coupled to the deck 102 and at least partially surround the side discharge outlet.

Figure 2:
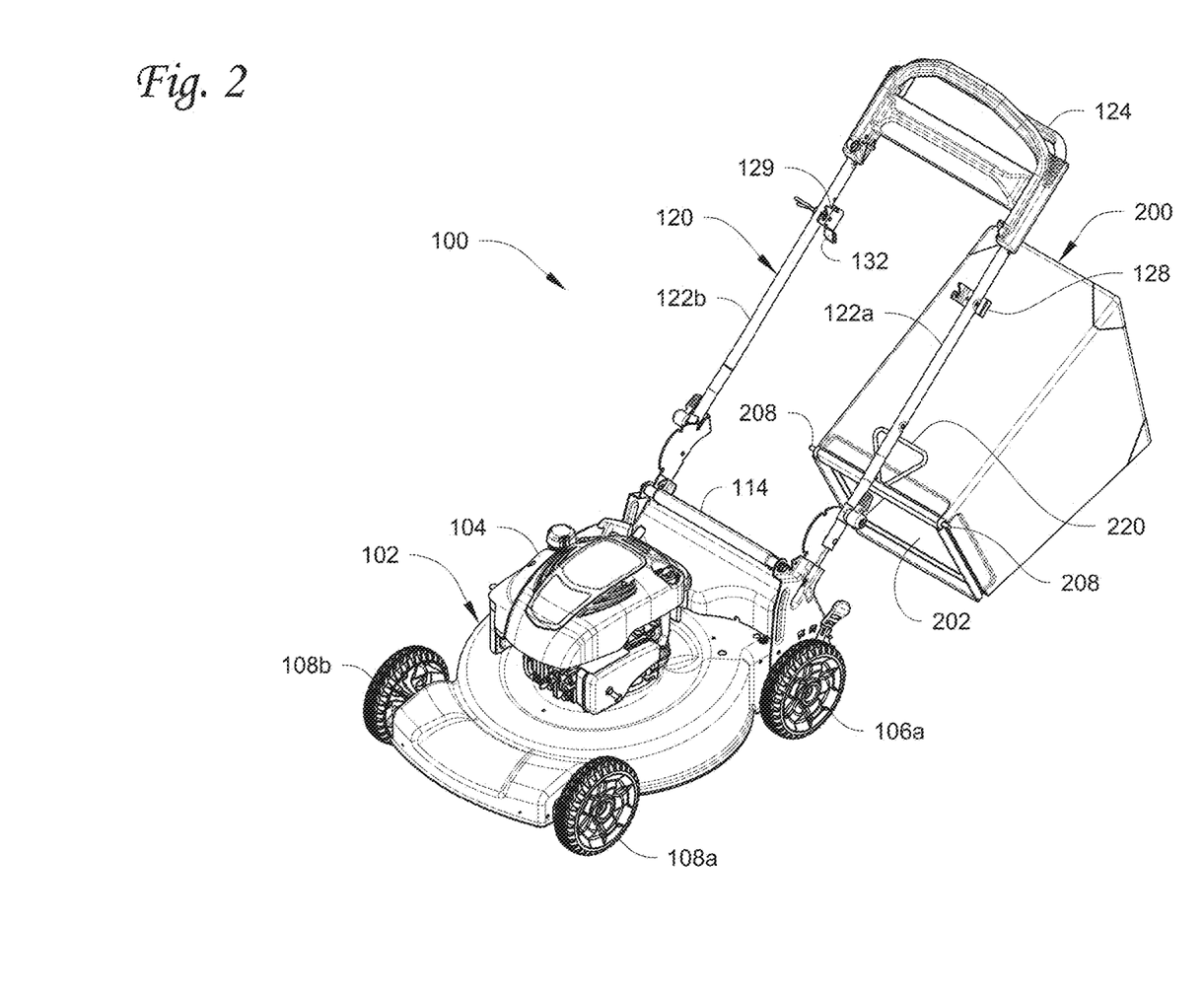
FIG. 2 is a perspective view of the mower of FIG. 1 with the debris container shown removed and the mower shown in a mulching mode.

The grass catcher of a conventional mower, when the latter is in a mulching (similar to FIG. 2) or side discharge mode, would normally be removed from the mower (as shown in FIG. 2) and remotely stored. However, the debris container 200 of the exemplary mower 100 may simply be re-located from its grass collecting configuration (see FIG. 1) on the mower and re-attached to the mower in a stowed configuration as shown in FIG. 3. When the debris container 200 is in the stowed configuration, the mower 100 may correspondingly be configured in either the mulching mode or the side discharge mode.

In one embodiment, the debris container 200 may be oriented such that its opening 202 is exposed to, and accessible by, the operator when in the stowed configuration as shown in FIGS. 3 and 4. That is to say, the opening 202 may be oriented in such a manner that the operator may easily place debris into the container 200, via the opening 202, when the container is in the stowed configuration. Accordingly, while shown as generally facing upwardly, the opening 202 could be configured in other orientations (e.g., the opening could define an axis that is vertical, or an axis that is tilted, e.g., up to 90 degrees or more from vertical) without departing from the scope of this disclosure. In fact, "exposed and accessible," as used herein, indicates only that the opening 202 is configured so that the operator may easily deposit debris into the container via the opening.

To accommodate attachment of the debris container 200 to the mower 100 in such a stowed configuration, structure associated with the debris container 200 may engage corresponding structure associated with the handle assembly 120 (e.g., with the handle members 122). For example, the debris container 200 may be supported by the handle assembly 120 such that the opening 202 is exposed and accessible (e.g., facing upwardly) during mower operation. The mounting points/handle assembly 120 may support or suspend the debris container 200 above the ground surface 101 when the debris container is in the stowed configuration as shown in FIGS. 3 and 4.

Figure 5:
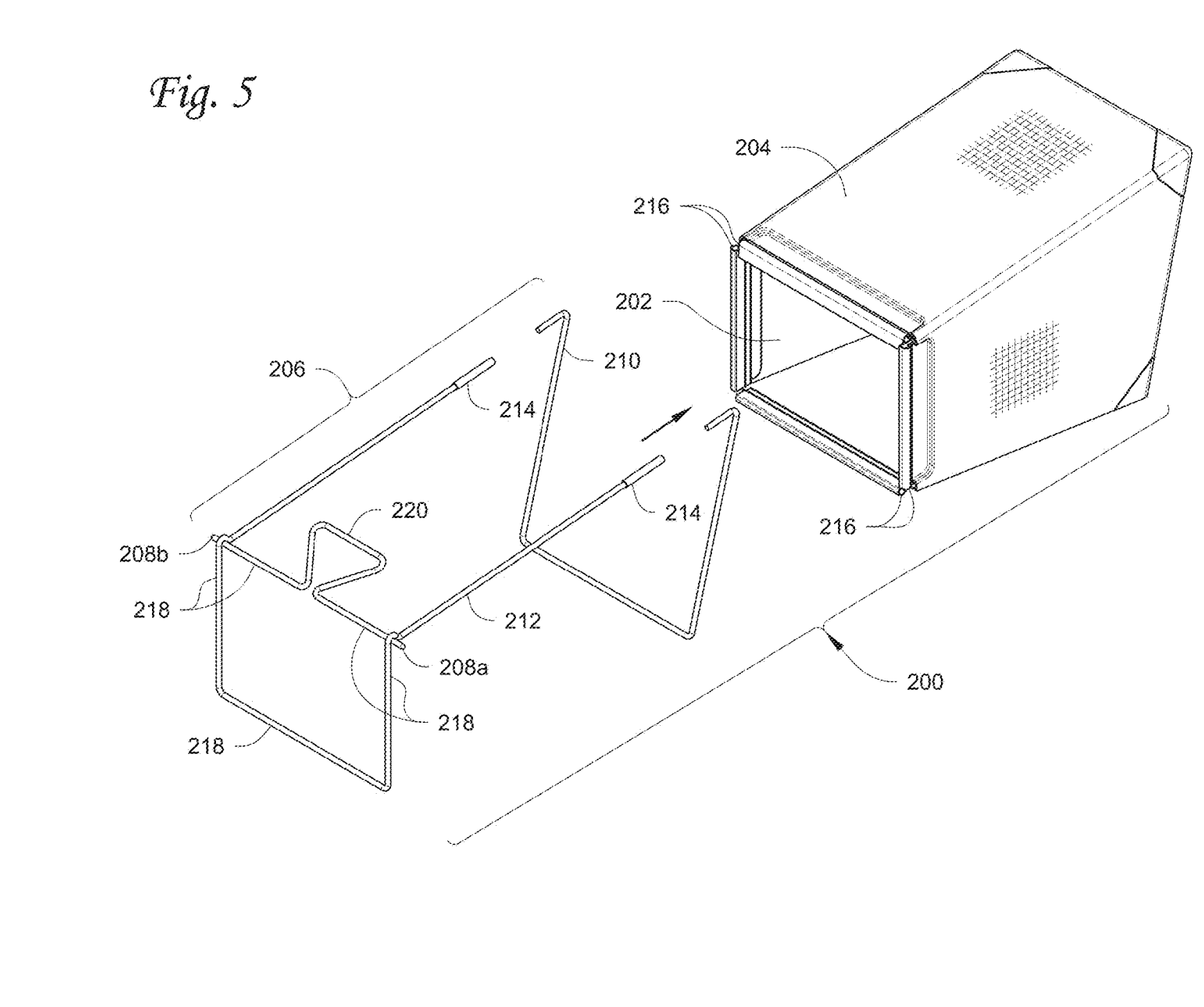
FIG. 5 is an exploded view of the debris container in accordance with one embodiment.

As shown in FIG. 5, the debris container 200 may be an assembly that includes walls formed of a flexible mesh material, the walls together defining a bag 204 having the opening 202. A rigid (e.g., metal) wire frame 206 may also be included to provide the bag 204 with the desired container shape. The bag 204 may be breathable such that air entering the debris container 200 (e.g., through the opening 202) during mower operation may be exhausted while debris (e.g., grass clippings) entrained within the air are contained.

In the illustrated embodiment, the wire frame 206 may include a series of wire members that are pre-assembled, or that may be end-user assembled. Assembly by the end-user may be beneficial, e.g., to accommodate shipping of the debris container 200 in reduced size packaging. For example, in one embodiment, the wire frame 206 may consist of two assemblies 210 and 212 and may be joined with tubular sleeves 214 as shown in FIG. 5. The sleeves 214 may provide sufficient interference to essentially permanently or semi-permanently connect the assemblies 210 and 212 to one another.

While shown as using two assemblies 210, 212 and the joining sleeves 214, such a configuration is not limiting. In fact, other embodiments may provide a unitary wire frame, or may join any number of wire frame components to one another via most any method (e.g., welding, crimping, fasteners, adhesives, etc.). In yet other embodiments, the wire frame 206 may include two or more assemblies that are hingedly joined such that the debris container may be collapsed (e.g., for shipment and/or for storage by the end user) when not in use, and then unfolded into a deployed configuration for use.

In one embodiment, the bag 204 may include features that permit the bag to attach to or otherwise engage the wire frame 206. For example, once the wire frame 206 is assembled, it may be received within the bag 204 (e.g., via the opening 202). As illustrated in FIG. 5, the bag 204 may include flexible (e.g., plastic or rubber) C-shaped sections 216 positioned along a perimeter of the opening 202. The sections 216 may deflect to permit corresponding frame elements 218 to pass into the C-shaped sections, thereby securing the bag 204 to the wire frame 206. Among other benefits, the wire frame 206 may provide the bag 204 with the desired shape during operation. In some embodiments, the wire frame, e.g., frame elements 218, may also define a handle 220 for grasping and lifting the debris container 200.

The debris container 200 (e.g., the wire frame 206) may include mounting points, (e.g., attachment members) adapted to couple to receivers on the deck (when in the grass collecting configuration), and to receivers on the handle assembly 120 (when in the stowed configuration). In one embodiment, the attachment members may form first and second (e.g., left and right) laterally and outwardly protruding pins 208a, 208b on corresponding first and second sides of the debris container 200 as shown in FIG. 5.

Figure 6:
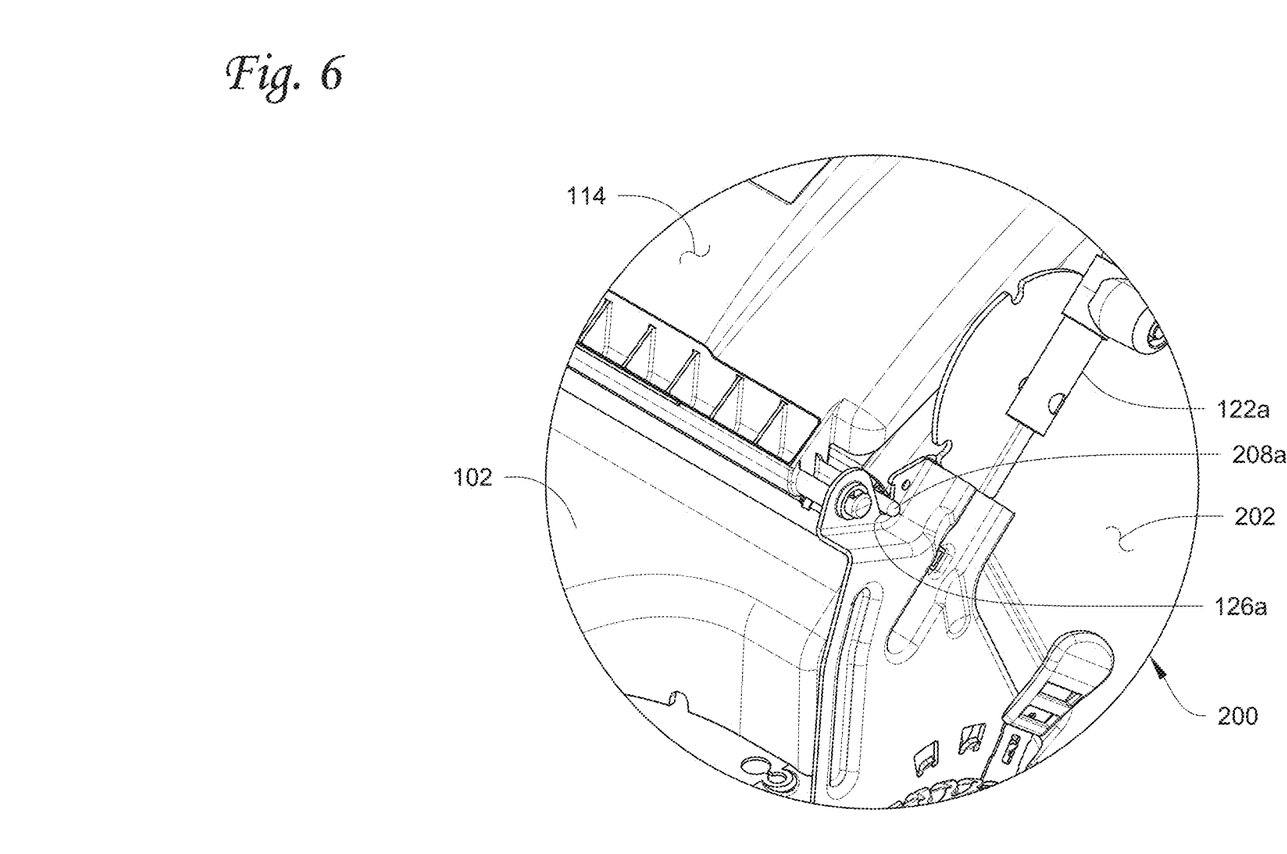
FIG. 6 is an enlarged, partial perspective view of the mower of FIG. 1 illustrating attachment of the debris container to the mower when the debris container is in the grass collecting configuration.

The pins 208 may support the debris container in one or both of the grass collecting configuration and the stowed configuration. For example, as indicated in FIG. 6, the pins 208a, 208b may mechanically couple or engage corresponding first and second receivers 126a, 126b on the deck, e.g., in the vicinity of a hinge line of the door 114 (while only left side pin 208a/receiver 126a is illustrated in this view, the right side is substantially a mirror image) such that the opening 202 of the debris container is in communication with the discharge port 110 (see FIG. 4) of the deck 102. Accordingly, to operate the mower in the grass catching mode, the operator may attach the debris container 200 to the mower 100 by grasping the debris container 200 (e.g., via the handle 220) and, after pivoting the door open as shown in FIG. 1, insert the pins 208 into the corresponding receivers 126. The weight of the debris container 200 (as well as the force applied by the rear door 114, which is biased toward the closed position of FIG. 2) may then keep the debris container in the desired position.

In the illustrated embodiment, the first and second pins 208a, 208b are formed by the frame 206 and are oriented co-axial to one another. However, other embodiments may utilize different pin configurations or, alternatively, different attachment members altogether. In fact, the attachment members may be configured in most any manner (e.g., hooks, loops, etc.) that allows the container 200 to be coupled to the mower in both the grass collecting configuration and the stowed configuration. Moreover, while described as accommodating both the grass collecting and stowed configurations with the same attachment members (e.g., same pins 208), other configurations could use one set of attachment members for the grass collecting configuration, and another set of attachment members for the stowed configuration.

Figure 7A:
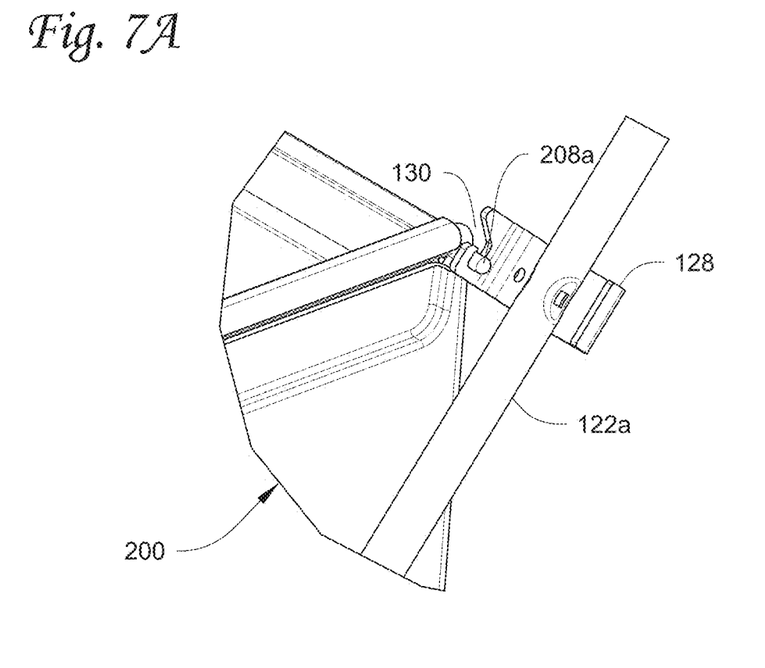
FIG. 7A is a perspective view of a first or left handle tube of the handle assembly.
Figure 7B:
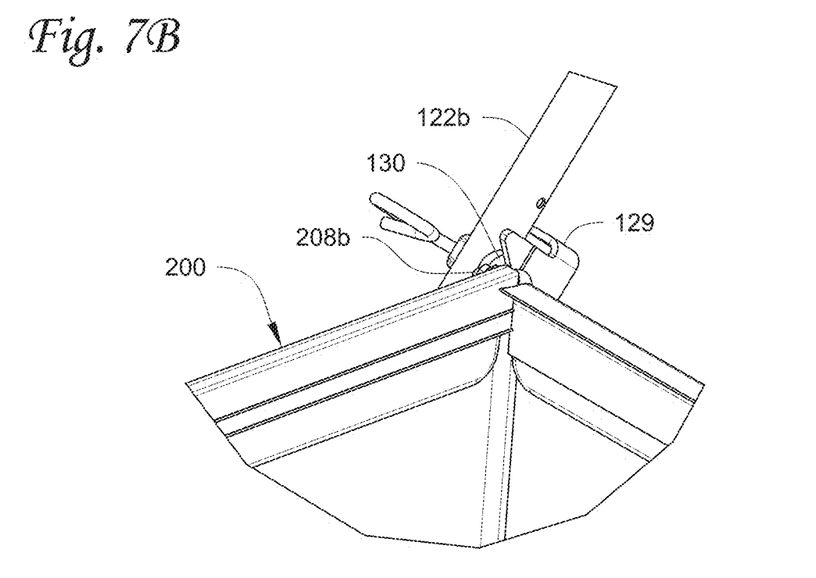
FIG. 7B is a perspective view of a second or right handle tube.
Figure 8:
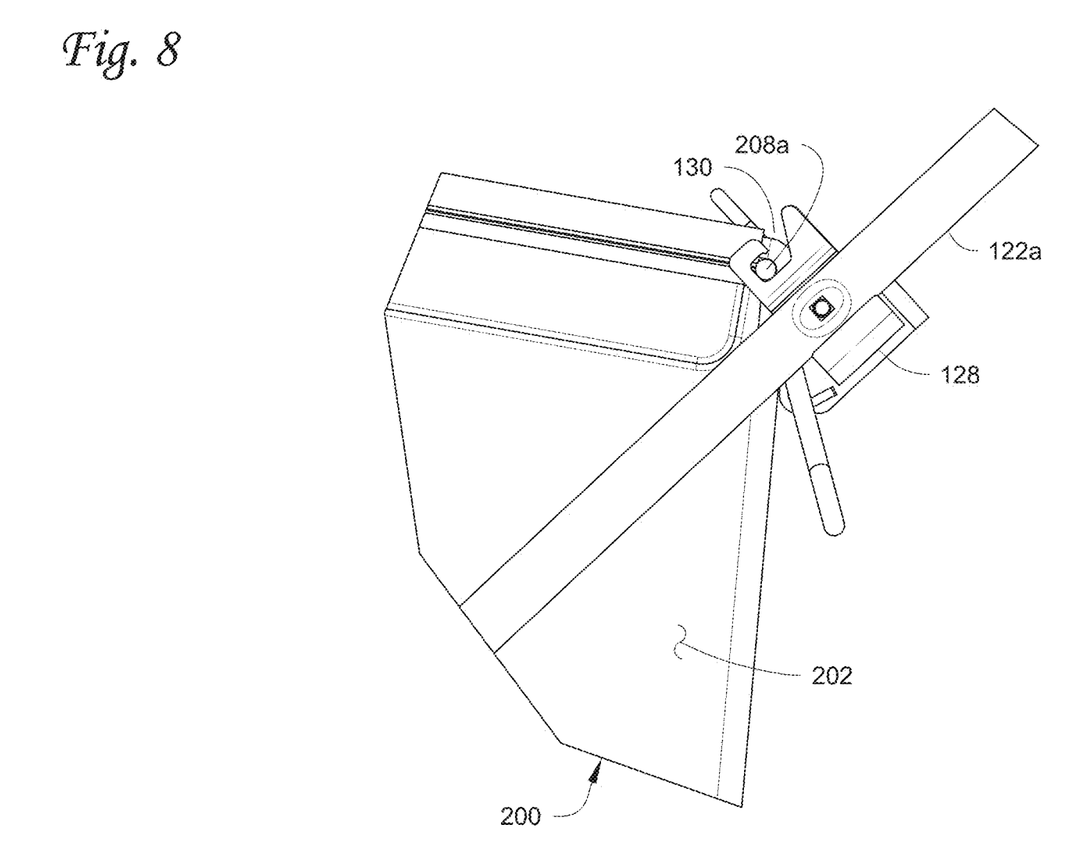
FIG. 8 is an enlarged side elevation view of the left handle tube and associated components of FIG. 7A.

When the operator chooses to operate the mower in the mulching mode (or the side discharge mode), the debris container 200 may be removed from the grass collecting configuration of FIG. 1 and moved to the stowed configuration of FIG. 3. To achieve this reconfiguration, the operator may lift the rear door 114 and then lift the debris container 200 (e.g., by the handle 220) and move it rearwardly until the door 114 can close as shown in FIG. 2. Once the debris container 200 is clear of the door 114, the debris container may be rotated and lifted upwardly until the first and second pins 208a, 208b are positioned above corresponding third and fourth lugs or receivers 128, 129 located on the handle tubes of the handle assembly 120, e.g., upon the handle members 122 (see, e.g., FIG. 3). At this point, the debris container 200 may be lowered such that each pin 208 mechanically couples to or engages a slot 130 formed in its respective receiver as shown in FIGS. 7A, 7B, and 8. Accordingly, the debris container 200 may be effectively hung by the pins 208 from the handle assembly 120.

In one embodiment, the weight of the debris container 200 may tend to rotate (e.g., about the pins 208) the container such that a lower portion moves toward the operator as indicated by the arrow 222 in FIG. 4. To reduce such swinging of the debris container 200, one or both of the third and fourth receivers (e.g., the receiver 129 as shown in FIG. 2) may include a limit or stop member 132 that abuts the debris container 200 when it is in the stowed configuration. This abutment may immobilize the debris container, e.g., prevent the debris container from rotating (at least in the direction 222 of FIG. 4) during mower operation. While shown as being part of the receiver 129, the stop member 132 could be independent of the receivers 128, 129, e.g., it could be formed by a cross-member (not shown) extending between the handle members 122. Furthermore, in other embodiments, the stop member could be located elsewhere on the mower, e.g., the stop member could be formed by a portion of the deck 102.

In alternate embodiments, the debris container 200 could, when in the stowed configuration, be additionally supported at other locations on the handle assembly 120 and/or the deck 102. Additionally, other embodiments may position the debris container 200 at different elevations if desired.

The stowed configuration of FIGS. 3 and 4 may be used to provide a debris receptacle (e.g., for sticks, trash, etc.) that is transported with the mower. Even if not used for such debris collection, the container (when in the stowed configuration) is provided with convenient, on-board storage (e.g., when the mower is operating in mulching or side discharge modes). Still further, embodiments of the debris container 200 allow compact storage of the container (in the stowed configuration) on the mower when the mower is not in use.

Although not illustrated, the mower could include other receivers, e.g., on the deck or on the handle assembly, that permit storage of other tools. For instance, the receivers could be formed by a tray or the like provided on the handle assembly. The tray may not only receive the container 200 when the latter is in the stowed configuration, but may also permit carrying of other items such as a yard tool, e.g., small rake or the like, during mower operation.

Figure 9:
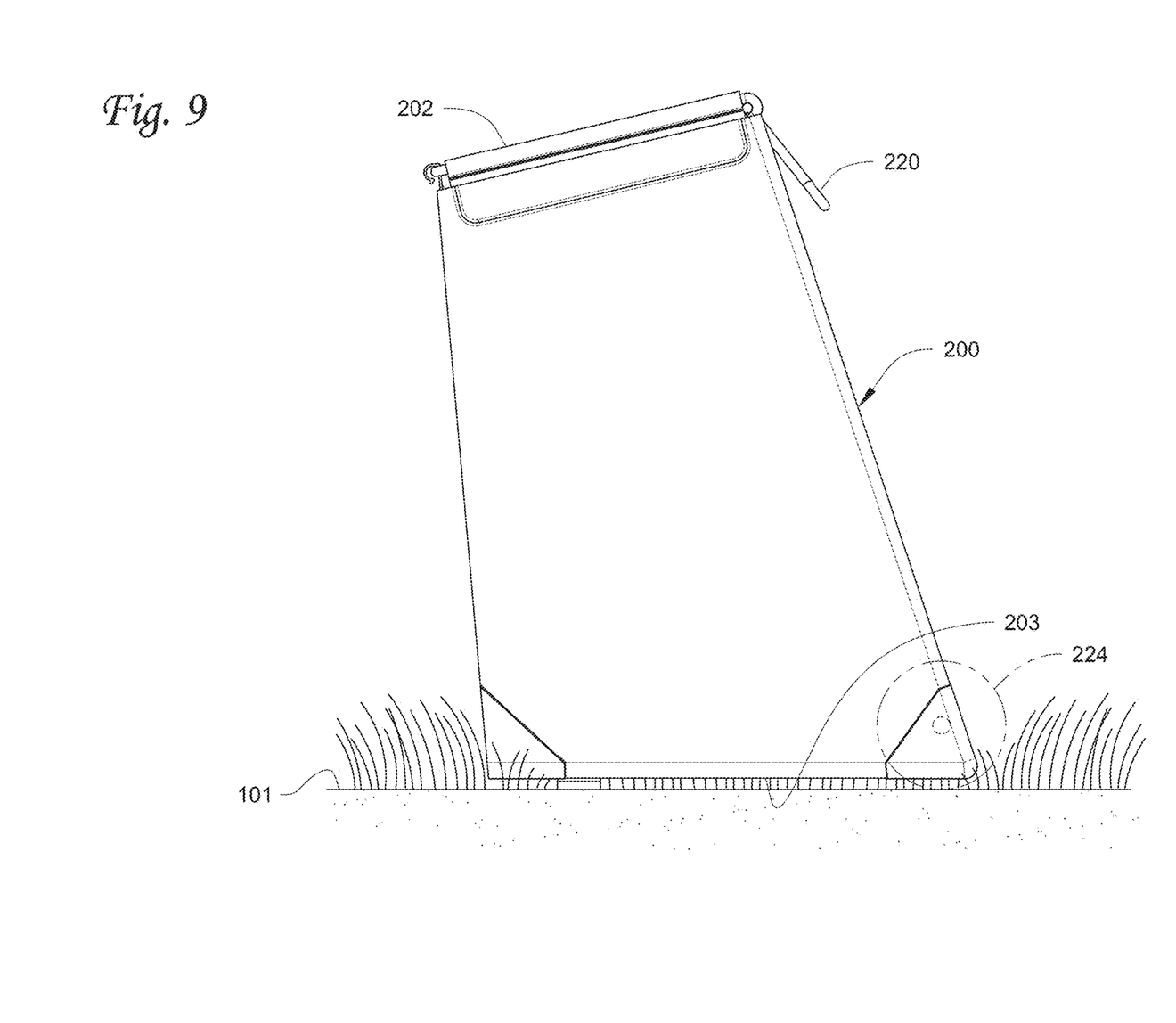
FIG. 9 is a side elevation view of the debris container of FIG. 2 (removed from the mower) and shown in a detached, free-standing configuration upon a ground surface.

The wire frame 206 (see FIG. 5) may be adapted to maintain the shape of the debris container 200 even when the latter is removed from the mower. For example, FIG. 9 illustrates the debris container 200 in a third, free-standing configuration resting upon the ground surface 101. In the illustrated embodiment, structure (e.g., the wire frame 206) is configured to support the debris container 200, on an end 203 opposite the opening 202, in the free-standing configuration. Accordingly, the operator may use the debris container in the free-standing configuration completely independently of the mower 100, e.g., as a free-standing lawn waste receptacle. In some embodiments, two or more coaxial wheels 224 (only one visible in FIG. 9) could be provided on the container 200 (e.g., at or near adjacent corners of the end 203 as shown in FIG. 9). The wheels 224 may permit the operator to tilt the container during use and roll it across the ground surface 101 (e.g., using the handle 220). Support axles for each of the wheels 224 may be attached to the wire frame 206.

While illustrated herein as incorporating a rigid wire frame 206, the debris container may take other forms. For instance, the debris container could be configured as a collapsible spring bucket similar to the model 29210 43 gallon gardening spring bucket distributed by the Toro Co. of Minneapolis, Minn. USA. A debris container 200 using such a collapsible mechanism could permit collapsing of the debris container when not needed (e.g., when the mower is in mulching mode) to reduce the container's overall envelope. Such a debris container could be stored, e.g., in its collapsed or expanded configuration, on the mower (e.g., at the receivers 126 or the receivers 128, 129).

The complete disclosure of the patents, patent documents, and publications cited herein are incorporated by reference in their entirety as if each were individually incorporated.

Illustrative embodiments are described and reference has been made to possible variations of the same. These and other variations, combinations, and modifications will be apparent to those skilled in the art, and it should be understood that the claims are not limited to the illustrative embodiments set forth herein.

What is claimed is:

1. A lawn mower comprising:
    a deck comprising an upper wall and downwardly extending sidewalls that together define a cutting chamber, wherein one or both of the upper wall and the sidewalls define a discharge port;
    a plurality of wheels supporting the deck upon a ground surface;
    a cutting element operatively supported within the cutting chamber;
    an operator handle assembly connected to the deck and extending outwardly therefrom; and
    a debris container defining an opening, the debris container comprising a frame, the debris container adapted to attach to the mower both: in a grass collecting configuration, wherein the debris container is supported by one or both of the deck and the handle assembly such that the opening is in communication with the discharge port to receive clippings into the debris container through the opening; and alternatively in a stowed configuration, wherein the debris container is supported above the ground surface by the handle assembly such that the opening faces upwardly and is exposed and accessible.

2. The mower of claim 1, wherein the frame comprises attachment members adapted to couple: to the deck when the debris container is in the grass collecting configuration; and to the handle assembly when the debris container is in the stowed configuration.

3. The mower of claim 2, wherein the attachment members comprise laterally protruding first and second pins that engage: associated first and second receivers, respectively, on the deck when the debris container is in the grass collecting configuration; and engage third and fourth receivers, respectively, on the handle assembly when the debris container is in the stowed configuration.

4. The mower of claim 1, wherein one or both of the deck and the handle assembly further comprises a stop member adapted to abut and immobilize the debris container when the debris container is in the stowed configuration.

5. The mower of claim 1, wherein the debris container further comprises a flexible bag supported by the frame.

6. The mower of claim 5, wherein the frame is adapted to support the debris container, upon an end opposite the opening, in a free-standing configuration when the debris container is removed from the mower.

7. The mower of claim 5, wherein the frame is adapted for end-user assembly from two pieces.

8. A lawn mower comprising:
    a deck comprising an upper wall and downwardly extending sidewalls that together define a cutting chamber, wherein a discharge port extends through one or more of the upper wall and the sidewalls;
    a plurality of wheels supporting the deck upon a ground surface;
    a prime mover attached to the upper wall of the deck;
    a rotatable cutting element positioned within the cutting chamber, the cutting element operatively attached to an output shaft of the prime mover;
    an operator handle assembly connected to the deck and extending upwardly and rearwardly; and
    a debris container comprising laterally protruding first and second pins and further defining an opening, wherein the debris container is adapted to attach to the mower both: in a grass collecting configuration, wherein the laterally protruding first and second pins mechanically couple to the deck such that the opening is in communication with the discharge port; and alternatively in a stowed configuration, wherein the laterally protruding first and second pins mechanically couple to the handle assembly such that the opening is exposed and accessible.

9. The mower of claim 8, wherein the laterally protruding first pin is located on a first side of the debris container, and the laterally protruding second pin is located on a second side of the debris container.

10. The mower of claim 9, wherein the handle assembly comprises first and second lugs operable to receive the first and second pins, respectively, when the debris container is in the stowed configuration.

11. The mower of claim 9, wherein the first and second pins are coaxial.

12. The mower of claim 9, wherein the debris container may rotate about the first and second pins when the debris container is in the stowed configuration.

13. The mower of claim 12, further comprising a stop member configured to limit rotation of the debris container about the first and second pins.

14. The mower of claim 8, wherein the debris container comprises mesh walls supported by a wire frame.

15. The mower of claim 14, wherein the wire frame forms the laterally protruding first and second pins.

16. The mower of claim 8, wherein the laterally protruding first and second pins are adapted to suspend the debris container above the ground surface when the debris container is in the stowed configuration.

17. The mower of claim 8, wherein the debris container further comprises structure adapted to support the debris container, upon an end opposite the opening, in a freestanding configuration when the debris container is removed from the mower.

18. The mower of claim 17, wherein the structure comprises two wheels at or near the end of the debris container opposite the opening of the debris container.

19. A walk-behind lawn mower comprising:
- a deck comprising an upper wall and downwardly extending sidewalls that together define a cutting chamber, wherein a discharge port extends through one or more of the upper wall and the sidewalls, the deck further comprising first and second receivers;
- a plurality of wheels supporting the deck upon a ground surface;
- a prime mover attached to the upper wall of the deck;
- a rotatable cutting element positioned within the cutting chamber, the cutting element operatively attached to an output shaft of the prime mover;
- a handle assembly connected to the deck, the handle assembly comprising first and second handle tubes extending upwardly to form an operator control handle, wherein the first and second handle tubes comprise third and fourth receivers, respectively; and
- a debris container defining an opening, the debris container comprising first and second pins, wherein the debris container is adapted to attach to the mower both: in a grass collecting configuration, wherein the first and second pins mechanically couple to the first and second receivers, respectively, such that the opening is in communication with the discharge port; and alternatively in a stowed configuration, wherein the first and second pins mechanically couple to the third and fourth receivers, respectively, such that the opening faces upwardly.

20. The mower of claim 19, wherein the debris container further comprises a frame adapted to support the debris container, upon an end opposite the opening, in a freestanding configuration when the debris container is removed from the mower.

* * * * *

UNITED STATES PATENT AND TRADEMARK OFFICE
CERTIFICATE OF CORRECTION

PATENT NO. : 9,750,186 B2
APPLICATION NO. : 14/595561
DATED : September 5, 2017
INVENTOR(S) : Hurst et al.

It is certified that error appears in the above-identified patent and that said Letters Patent is hereby corrected as shown below:

In the Abstract (57)

Line 1, "A walk-behind is configurable" should be changed to --A walk-behind mower is configurable--.

Signed and Sealed this
Twenty-third Day of January, 2018

Joseph Matal
*Performing the Functions and Duties of the*
*Under Secretary of Commerce for Intellectual Property and*
*Director of the United States Patent and Trademark Office*